INVENTORS
CHARLES J. BRUCKNER
BY EDWARD A. WHITE

William Klabunde
ATTORNEY

United States Patent Office 3,560,167
Patented Feb. 2, 1971

3,560,167
UPFLOW CATALYTIC REACTOR FOR FLUID
HYDROCARBONS
Charles J. Bruckner, Drexel Hill, and Edward A. White, Middletown Township, Pa., assignors to Air Products and Chemicals, Inc., Philadelphia, Pa., a corporation of Delaware
Filed Dec. 18, 1968, Ser. No. 784,712
Int. Cl. B01j 9/04
U.S. Cl. 23—288                                10 Claims

ABSTRACT OF THE DISCLOSURE

A reactor for contacting hot, liquid-phase or mixed-phase hydrocarbons with a compact mass of granular catalyst maintained within the reactor as a fixed bed; in which reactor, the liquid hydrocarbons, with or without accompanying gaseous reactants, are caused to flow upwardly through the bed, in a flooded operation, at such relatively-high rate of flow as to cause possible mass lifting and falling of the bed or such volumetric expansion thereof as to create an internal disturbance of the catalyst particles resulting in detrimental attrition of the catalyst. The reactor is provided at its upper end and spaced therefrom with a perforated frusto-conical means to contain the upper portion of the bed. Means are provided for automatically adding inert material to the top of the bed through the frusto-conical means from a reservoir mounted on top of the reactor vessel.

BACKGROUND OF THE INVENTION

The apparatus of the invention is useful, for example, in upflow, liquid-phase, treatment of hydrocarbons with gaseous material, in a flooded operation, under conditions tending to produce undesirable reaction products, such as polymers or other materials, which progressively build up as a contaminant deposit on the catalyst particles, especially across the bottom or inlet region of the bed, and introduce adverse pressure drop conditions which may disrupt the bed.

Upflow reactors for contacting liquid-phase material with particulate solid material in a flooded operation are known to the art, as are mechanical holddown devices, such as perforate plates, grids, screens, etc., for confining the solids as a fixed bed within a prescribed region of the reactor comprising the reaction zone.

In commercial operations involving high-temperature treatment of hydrocarbons, however, the physical size of the apparatus as well as the operating conditions, the nature of the reaction and the characteristics of the catalyst each to some degree preclude the use of holddown plates or screens for the reasons that they would necessarily be heavy and difficult to fabricate, install and remove.

SUMMARY OF THE INVENTION

In accordance with the invention, the reactor comprises an upright, elongate vessel having internal grating means for supporting a bed of particulate solid material comprising catalyst for promoting the desired hydrocarbon conversion. The bottom region of the vessel, beneath the grating, provides a plenum for admixing fluid reactants, such as liquid-phase or mixed-phase hydrocarbons, heat-conveying liquid diluent material and gas feed, all separately supplied through inlets at the bottom of the vessel. Distributing devices are provided at successive levels within the plenum to provide predetermined sequential admixture across the vessel so as to achieve substantial uniformity as to composition and temperature of the liquid entering the bed through the grating.

The upper end of the reactor vessel is closed by a dished head and is axially extended by a smaller cylindrical vessel or conduit, valved at its upper end, to provide both a controlled inlet for admission of solids and a fill-tube for maintaining a supply of solids to be added to the bed of solids within the reactor as needed.

Within the top region of the reactor and the bottom region of the fill-tube frusto-conical partition means are provided to form a top confining surface for a compact mass of solids extending from the internal grating to the upper opening of the partition means. The uppermost opening of the frusto-conical partition means is provided with a relatively short, small-size, pipe section which provides constricted open communication between the region of the fill-tube which is adapted to maintain the supply of solids and the bottom region of the fill-tube which is in open communication with the reactor vessel. The sides of the frusto-conical partition means are inclined at an angle to the horizontal greater than the angle of solids repose in order that the solids flowing into the reactor vessel will spread out in the upper region thereof to contact the under surface of the partition.

The lowermost perimeter of the frusto-conical partition means is secured to the wall of the dished head near its juncture with the cylindrical body portion of the vessel, and provision is made for differential expansion and contraction between the partition and the body of the reactor with changes in temperature. The space between the dished head and the frusto-conical partition provides a solids-free upper plenum for collection of fluid passing upwardly through the compact mass of solids. Perforations formed in the partition are sized to permit passage of the fluid but not of the solids. An outlet is provided in the wall of the dished head to discharge the fluid effluent from the upper plenum.

It is a principal object of the invention to establish substantial immobility of the solids mass comprising the catalyst bed. In a preferred arrangement the bed of catalytc material is sandwiched between a shallow supporting layer of inerts and a covering body or layer of inerts completely filling the upper region of the reactor between the surface of the catalyst bed and the perforate frusto-conical partition.

If for any reason, during the operation of the reactor, adverse pressure drop conditions should develop to the extent that there is a tendency for the entire bed of solids to be expanded or to be lifted as whole, the frusto-conical partition means will serve as a hold-down means to prevent such expansion or lifting. In this connection the small-size pipe section at the top of the partition serves a most important function. It effectively prevents the solids mass from being forced upwardly through the pipe section into the fill-tube, even though the pipe is sized to permit unimpeded compact downward flow of solids from the fill-tube into the reactor in the event that there is need for replenishing the solids in the reactor as a result of any settling of the mass.

The solid particles of inerts forming the supporting and covering layers for the catalyst bed are composed of inert material, such as silica alumina, or other material having hardness and strength sufficient to minimize breakage or attrition in use.

Both layers of inerts are size-graded vertically, but in reverse order, the smallest inerts being adjacent to the catalyst. Each of the strata forming the supporting layer of inerts, and the deep catalyst bed itself, is spread to uniform depth across the vessel. The covering layer of inerts has two strata spread to uniform depth and a final covering portion of largest-size inerts extending upwardly through the frusto-conical partition and the fill-tube. The smallest size inerts immediately adjacent to the catalyst bed may be in the form of grain or small balls, the larger-size inerts preferably being ball-shaped. To contain the entire mass of solids the perforations in the frusto-conical partition and the openings in the grating are smaller than the largest size balls. The number of layers of inerts, and the size particles comprising each layer, is variable, depending only on what is necessary to prevent migration of catalyst bed particles, either up or down, into or through the layers of inerts.

DESCRIPTION OF THE DRAWINGS

For a fuller understanding of the invention, reference may be had to the following description and claims taken in connection with the accompanying drawings forming a part of this application, in which

DESCRIPTION OF THE PREFERRED EMBODIMENT

Figure 1:
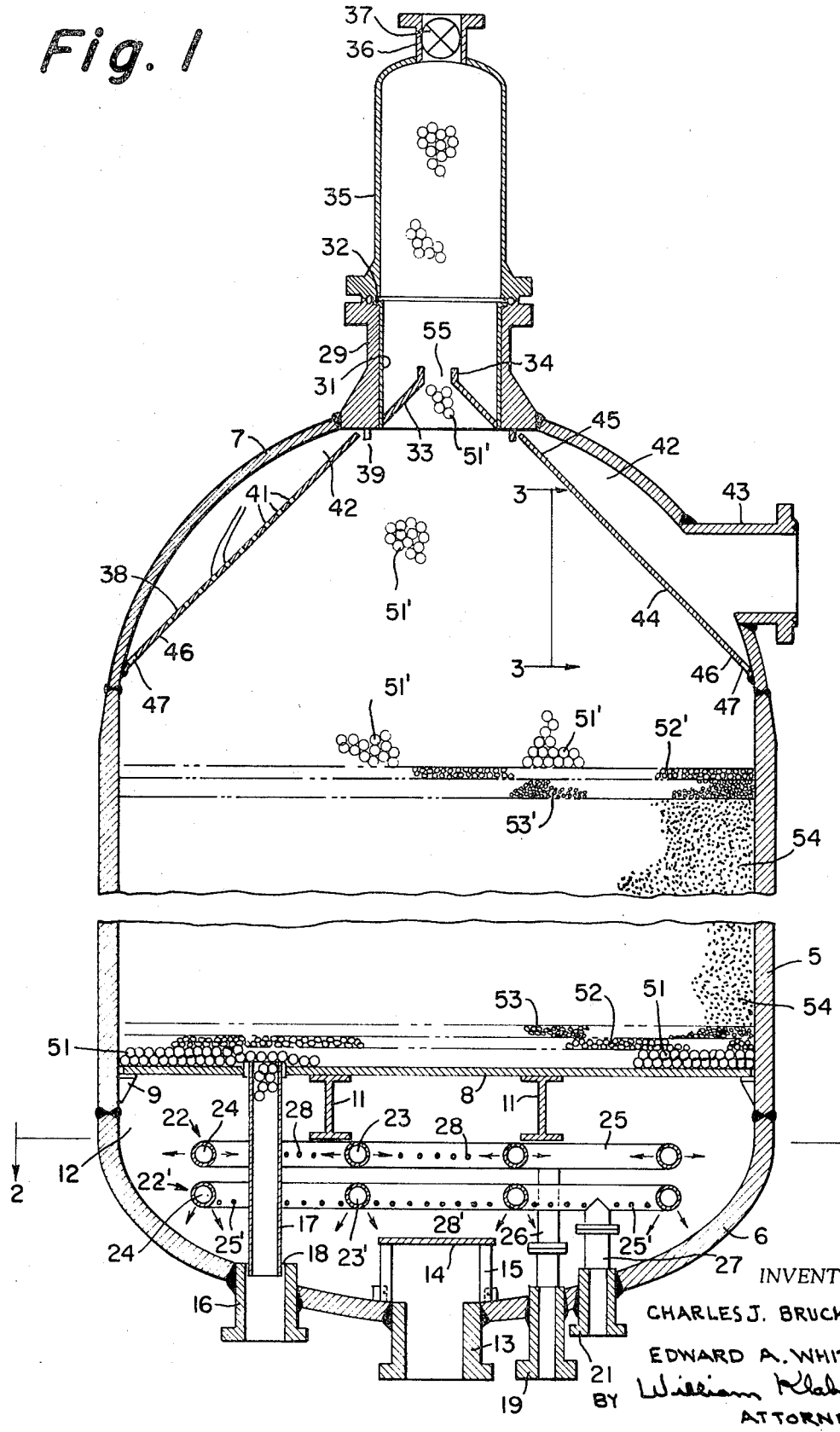
FIG. 1 is a vertical section of a reactor vessel embodying the improvements constituting the invention.
Figure 2:
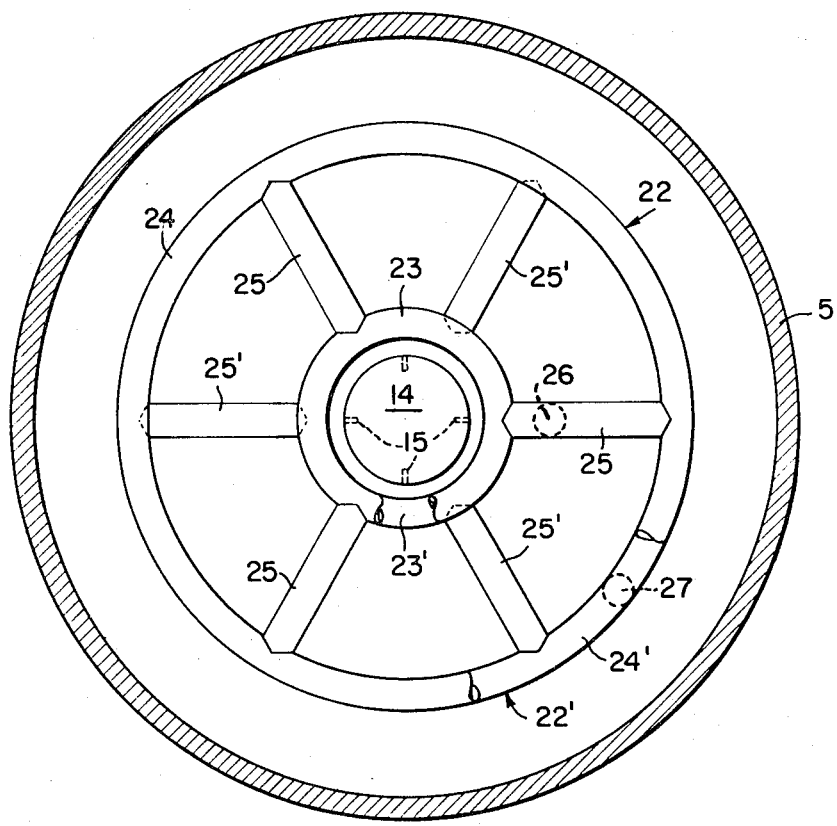
FIG. 2 is a horizontal section taken along line 2—2 of FIG. 1.

Referring to FIGS. 1 and 2 of the drawings, illustrating a preferred embodiment of the invention, the reactor comprises an upright, elongate vessel having a cylindrical body section 5 and dished heads 6 and 7 closing its lower and upper ends, respectively.

Within the lower end region of cylindrical body section 5 a grating 8 extends horizontally across the vessel. Grating 8 is supported along its perimeter by bracket or shelf-forming means 9 attached to and extending inwardly from the inner wall of the vessel, and by support beams 11 extending horizontally across the central region of the vessel and having their ends supported at the vessel wall. The internal space below horizontal grating 8 forms a plenum 12 for reception, distribution and admixing of the fluid materials charged to the reactor.

For the purpose of this description, though by no means limited thereto, it will be assumed that the reactor is adapted for relatively high-temperature conversion of liquid hydrocarbons involving the admixture of heat-containing liquid diluent and reactant gas with the hydrocarbon charge within the bottom plenum 12.

At the bottom of the reactor a central inlet nozzle 13 is provided for the diluent liquid. A baffle plate 14 rigidly supported by fixed uprights 15 is located within plenum 12 directly over inlet nozzle 13, the function of which is to deflect the incoming liquid laterally and provide good distribution of the same across the bottom region of the plenum.

To one side of central inlet nozzle 13 a drain nozzle 16 is provided for removal of the mass solids from the vessel. A vertical downcomer pipe 17, having its upper end set in an opening provided in grating 8 and its lower end projecting into drain nozzle 16, conveys the withdrawn solids as a confined stream through the plenum 12 to the exterior of the reactor. A sliding fit is provided at 18 between the interengaging ends of nozzle 16 and downcomer 17 to accommodate differential expansion. Additional inlet nozzles 19 and 21 for incoming gaseous and liquid reactants, respectively, are provided at the bottom of the vessel, as shown. Nozzles 19 and 21 may be placed anywhere that mechanical design of the mixing plenum permits.

Ring-type fluid distributors, generally indicated by numerals 22 and 22', are provided within plenum 12 for introduction of the gaseous reactant and the liquid hydrocarbon charge, respectively. The upper distributor 22 is positioned as close to the underside of the grating as may be practicable, in order that the admixture of liquid and gaseous materials formed at that level may be brought into contact with the catalyst within a time interval insufficient to permit any substantial formation of undesirable reaction products, such as the formation of polymers which may become deposited on the solids at the bottom of the bed and create adverse pressure drop conditions for fluid passing upwardly through the solids mass. In the drawing, liquid distributor 22 is shown directly beneath the support beams 11, but it is contemplated that the distributor 22 may be located in the shallow region of the vessel occupied by the beams by providing openings in the sides of the beams to receive portions of the distributor.

Distributors 22 and 22', is shown in FIGS. 1 and 2, are of generally similar construction and are mounted one above the other concentric to the cylindrical reactor vessel. Each distributor comprises inner and outer concentric pipe rings, 23, 24 for distributor 22 and 23', 24' for distributor 22'. The pipe rings of each distributor are connected by crossover pipes 25, 25', respectively. A number of crossover pipes at equal angular spacing are provided for each distributor, three being illustrated.

Vertical pipes 26 and 27 connect distributors 22 and 22' to their respective inlet nozzles 19 and 21. Merely for convenience of illustration, vertical pipe 26 connects inlet nozzle 19 to one of the crossover pipes 25 of upper distributor 22, and vertical pipe 27 connects inlet nozzle 21 to the outer ring 24' of lower distributor 22'. In placing the distributors 22, 22' within the reactor, one is angularly rotated with respect to the other so that vertical pipe 26 may pass between crossovers of lower distributor 22'.

Pipe rings 23, 24, and 23', 24' of distributors 22 and 22', respectively, are provided with rows of holes 28 and 28', respectively, around the inner and outer circumferences. The holes 28 of pipe rings 23 and 24 are located on diametrically opposite sides of each pipe, and are arranged to discharge the fluid in a generally horizontal direction, that is, radially inward and radially outward, respectively, with respect to the vertical axis of the vessel. The holes 28' of pipe rings 23' and 24' are arranged in two circumferential rows along the underside of the pipes and are so arranged as to discharge the fluid in a generally downward direction. In the illustrated embodiment, the two rows of holes 28' on each pipe ring 23', 24' are at an angular spacing of 30° inwardly and outwardly from a vertical diameter of the pipe cross section.

Fluid distributors 22 and 22' may be rigidly supported in their desired location by conventional support means, not shown. Desirably, they may be arranged and adapted for ready dismantling and replacement during periods of shutdown for the purposes of inspection, repair of internals, and catalyst replacement.

Upper dished head 7 of the reactor vessel is provided with a solids inlet comprising a flanged nozzle 29 extending axially upward. Since commercial-size reactors for the type of hydrocarbon conversion contemplated by this invention generally are quite large, such as ten or more feet in diameter and twenty or more feet in height, nozzle 29 is of manhole size in order that it may additionally provide access for workmen into the interior of the vessel for the purpose of installing, removing, or servicing sections of grating, for placement and proper distribution of the inert solids forming the supporting and covering layers of the catalyst bed and for hand movement to the drain pipe 17 of solids which cannot be removed from the vessel in the gravity-flow draining operation.

Solids inlet nozzle 29 is provided with an internal, removable, cone insert member of irregular shape comprising a cylindrical body portion 31 fitted into and extending the full length of the nozzle, a narrow flange 32, at the upper end of the body portion, which overlies the flange face of the nozzle, a frusto-conical portion 33 within the bottom region of the body portion 31 and having its lower perimeter joined to the lower edge of the body portion, and a relatively-short cylindrical portion 34 extending upwardly from the upper perimeter of frusto-conical portion 33. The diameter of the cylindrical portion 34 preferably exceeds its length, and the latter need only be several inches to perform its intended function, hereinafter described.

A fill-tube 35, of such diameter as to form an upward extension of the manhole opening and of such length as to form a replacement solids reservoir of sufficient storage capacity to readily accommodate normal volume shrinkage of the solids mass after a period of reactor operation, is mounted on top of nozzle 29. Fill-tube 35 is flanged at its lower end for removable connection with the inlet nozzle. The fill-tube is closed at its upper end and is provided thereat with a smaller solids inlet nozzle 36 connectable to valve-controlled supply means for replenishing solids removed from the reservoir, only the valve 37 being shown in the drawing.

A frusto-conical, perforate partition 38 is provided within upper dished head 7 of the reactor vessel, and is attached, as by welding along its lower perimeter, to the lower side wall of the dished head. The upper end of the frusto-conical partition terminates near the discharge opening of solids inlet nozzle 29, but is arranged in such positional relationship with the lower ends of nozzle 29 and its associated cone insert as to allow for differential expansion between the partition and the reactor vessel with changes in temperature.

The frusto-conical partition 38 and the frusto-conical portion 33 of the cone insert serve together as a hold down device confining the upper surface of the solids mass. In each element the angle of the conic surface to the horizontal is greater than the angle of solids repose, in order that solids flowing through the cylindrical portion 34 of the cone insert to form or to replenish the mass of inert solids confined by the conical surfaces will readily spread outwardly to fill the entire region within the cones.

Since a stated object of the invention is to achieve substantially complete immobility of the solids mass within the reactor vessel, it is important that the structural configuration of the means for confining the top of the mass be such as not to create any solids-free spaces under the cones, that is, spaces or regions into which no solids will freely flow but into which solids may be pushed by undesired expansion or lifting of the solids mass. To this end, it is desirable to fabricate and to position the two frusto-conical elements 33 and 38 so that they will approximately present one continuous conical surface for confinement of the solids mass.

In the embodiment of the invention illustrated in FIG. 1 of the drawings, the upper perimeter of partition 38 lies slightly outside the discharge opening of lined inlet nozzle 29 and slightly below the underface of the nozzle. In order to prevent solids from either flowing through or being pushed through the annular gap between the upper rim of the partition and the underface of the inlet nozzle, a short ring 39 is affixed to the underside of the nozzle and projects slightly into the upper opening of the frusto-conical partition.

Alternatively, where conditions as to the angularity of the frusto-conical partition and desirable location of the partition wholly within the dished head can still be met, the ring 39 may be eliminated and the upper end of partition 38 may project slightly within the discharge end of the cone insert, overlapping for a short distance the lower end of frusto-conical portion 33.

Figure 3:
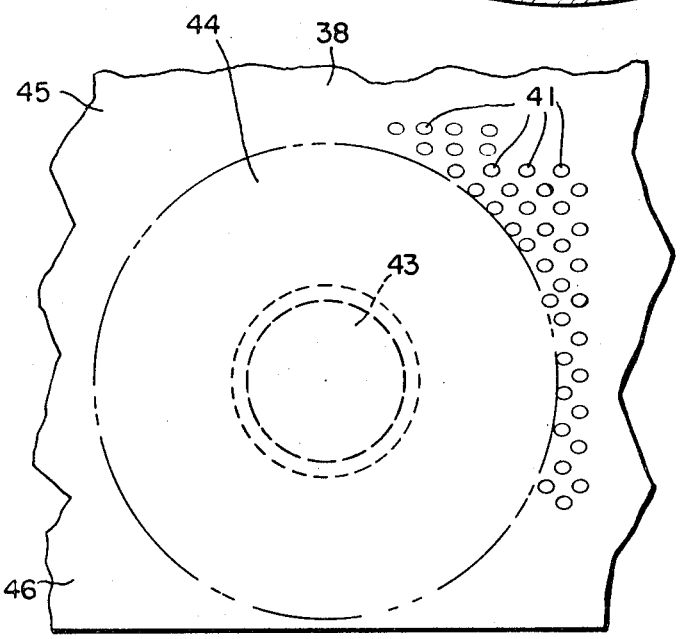
FIG. 3 is an enlarged fragmentary section of the reactor, taken along line 3—3 of FIG. 1 and showing the imperforate area of the frusto-conical partition directly opposite the reactor effluent outlet.

As shown in FIGS. 1 and 3, partition 38 is provided with a broad circumferential band of perforations 41 which permit upflowing fluid to become disengaged from the mass of solids and to flow through the perforations into the solids-free space 42 formed at the top of the vessel, between partition 38 and dished head 7. Space or region 42 provides an upper, fluid-collecting plenum to receive the disengaged effluent of the reaction carried out within the catalyst bed.

A plenum outlet nozzle 43 is set in the side wall of dished head 7 so as to discharge the collected reactor effluent laterally from the vessel. In order to prevent any undesirable channeling of liquid flow in the region of the bed and through the portion of the partition nearest the outlet 43, an area 44 of the partition, directly opposite the nozzle inlet and somewhat larger than the projected flow area thereof is left imperforate, as shown in FIG. 3. The upper and lower border areas 45 and 46 of partition 38 are imperforate, except for drainage openings 47 provided along its lower edge, where the partition is joined to the head near the juncture between the head and the body section 5 of the vessel. Perforations 41 are of a size smaller than the size of the inert solids which are to occupy the space within the frusto-conical partition 38 so that liquid flowing through the perforations will not carry any of the solids into the plenum 42.

Merely by way of example, a large reactor for the purposes recited would initially be set up for operation before the flanged fill tube 35 is connected to flanged nozzle 29 and before placement of the cone insert within the nozzle 29, so that workers may have access to the interior of the reactor for the purpose of setting up, in order, the supporting layer of inerts, the catalyst bed, and the covering layer of inerts. The fabrication and placement of the segmental grating is such as to preclude the passage of the large-size inerts between grating bar members and grating segments, or between the grating and the walls of the vessel.

Assuming the use of catalyst in the form of 3.2 mm. pellets, the inerts may range from grain size particles to balls of ¾ inch diameter. For example, the first solids to be introduced into the reactor may be relatively large-size balls 51 of inert material, such as alumina, having a diameter of about three-fourths of an inch. Balls 51 fill drain pipe 17 and nozzle 16 down to a blind flange, not shown, and are spread over grating 8 to a uniform depth of three inches. Next above, may be spread a uniform two-inch layer of similar inert balls 52 having a diameter of about three-eighths of an inch. On top of this layer there may be another two-inch layer of still smaller inerts 53, either in the form of one-eighth inch diameter balls or possibly of irregular form, known as grain. These inerts 51, 52 and 53 together form the supporting layer for the catalyst bed.

Granular catalyst is then poured into the vessel to a depth of about ten feet, terminating at a level below the top of cylindrical section 5, to form the catalyst bed 54. The catalyst bed is leveled off and inert solids similar to those comprising the supporting layer are deposited on top of the catalyst bed. Reversing the order of size, the covering layer comprises a bottom portion of small balls or grain 53' to a depth of three inches, an intermediate portion of three-eighth inch diameter balls 52', and a top portion of three-quarter inch diameter balls 51' which extends to the top of the reactor vessel and upwardly through the cone insert of nozzle 29 and the fill tube 36. The final portion of solids 51' is poured after the workers leave the vessel through manhole nozzle 29 and have placed the cone insert in the nozzle and attached the fill tube 35 to the nozzle.

After the vessel has been filled with solids the compact mass is forceably settled, as by pressuring from the top. Any loss of volume in the total solids mass is reflected in the level of solids within the fill tube 35. Before the reactor is placed on stream the fill tube is filled from the supply source of largest size (¾") inerts through valve 37.

As stated, a particular problem to which the improvements constituting the invention are directed is that of lifting or expansion of the solids mass as a result of adverse pressure conditions. Such conditions may exist, for example, where the choice of design flow quantities and reactor diameter result in upward pressure gradient sufficient to expand or lift the catalyst bed, or where the nature of the reaction and the duration of on-stream operation causes contaminant polymer material to be deposited on the solids at the bottom or entry portion of the solids mass, thereby introducing an excessive lifting force. Bed expansion cannot occur when the vessel is newly packed with settled solids, because there is little or no room for expansion and the mass as a whole is relatively immobile. After a period of operation, however, some further settling of the solids mass may occur. As the bed settles, and tends to create a void at the top, the reserve supply of large inert balls in fill tube 35 automatically replenishes the covering layer 51' of inerts, the balls flowing downwardly through the cylindrical inlet portion 34 of the cone insert.

During those periods of operation in which the reserve supply of large inert balls in fill tube 35 has been called upon to replenish the covering layer of large inerts confined within frusto-conical partition 38 and frusto-conical portion 33 of the cone insert of nozzle 29, thus creating a solids-free space at the top of the fill tube, it is most important that upward displacement of the catalyst bed, induced by the upflow of liquid and gas, be prevented. To prevent such displacement, the solids 51' contained within frusto-conical members 33 and 38 must be prevented from rising through the cylindrical portion of 34 of the cone insert into the fill tube.

It is a feature of the invention that the size and depth of the orifice 55 provided by member 34 be such as to effectively block such undesirable upward movement of solids through the orifice. To achieve such purpose, the cylindrical member 34 should be of a length at least several times the diameter of the alumina balls contained therein, and should provide an orifice of a size about 7 to 9 times such ball diameter. While orifices of smaller diameter may prove equally effective in checking the upward movement of solids, they may become more limiting on the desired free and rapid downward movement of the solids through the orifice when replenishment due to bed settling is required. The length of cylindrical orifice member 34 may be greater than the above-recommended length of several ball diameters, but to little practical purpose. All the compaction required to plug the orifice against upward movement of solids through the orifice appears to occur within a relatively-short vertical distance. Solids above the shallow zone in which plugging has occurred may be moved about freely or even be removed without breaking the seal.

The foregoing phenomena were observed in a series of experiments performed in a substantially commercial-size test model to determine the relationships between orifice size and length, and load applied as an upward force against a compact mass of solids confined within and below a model frusto-conical cone.

The test model comprised a section of 20-inch pipe, a frusto-conical 45° cone section fitted securely within and closing the upper end of the pipe, an axially-movable, circular plate fitted within the bottom portion of the pipe, and hydraulic means for applying variable lifting force to the movable plate. To determine the effects of orifice diameter and the use of a frusto-conical partition with and without a short cylindrical neck or collar tests were performed on partitions having orifice diameters of 6, 8 and 10 inches before and after the addition of a 2 inch neck.

In each experiment the space or chamber defined by the pipe walls, the movable bottom plate and the frusto-conical partition was first filled with ¾" diameter alumina balls. An increasing upward force was then applied to the movable plate to lift and compress the compact mass of solid balls against the frusto-conical partition and, if possible, to push the balls upwardly through the orifice. The results of the six experiments required to test three sizes of orifices, with and without a 2-inch neck or collar, are tabulated below.

EXPERIMENT I

| | Total load, pounds | |
|---|---|---|
| | Without 2" neck | With 2" neck |
| Orifice size, inches: | | |
| 6 | Negligible | 26,000 |
| 8 | do | 14,000 |
| 10 | do | 10,000 |

When the upward force was applied to the bottom plate of the test unit while partitions without the neck were being tested, the balls moved upwardly with negligible resistance and readily spilled over the upper perimeter of the cone. Substantially no resistance to such overflow was offered with any of these plain frusto-conical partitions.

When the same thing was done with partitions having a 2-inch long neck, it was found that with each orifice size there was considerable resistance to upward flow, as indicated by the recorded maximum load values. With the 10-inch and 8-inch diameter necks, balls started spilling over when loads of 10,000 and 14,000 pounds, respectively, were applied. With the 6-inch neck, no spillover occurred, even when a load of 26,000 pounds was applied. At this level the test was discontinued, since the applied force already represented 180% of the arbitrary design load, which was 50 p.s.i. In this latter test, the action of the compact mass of balls was closely observed as the load was gradually increased.

At 1,000 pounds, the balls started to enter the 6-inch neck orifice. As the load increased from 1,000 to 16,000 pounds, the surface of the mass of balls crowned, with the top of the crown extending 1-inch into the neck. At 16,000 to 20,000 pounds the crown extended 1½ inches into the neck, and at 20,000 to 26,000 pounds the crown extended 2 inches into the neck. These tests were duplicated four times, with substantially the same results. It appeared that the entire plugging action was concentrated in the lower region of the neck orifice. When the neck became substantially filled with balls, the balls at the surface could easily be moved about by hand, or even removed, without the plug seal being broken. It was thus evident that no appreciable advantage would be gained by increasing the length of the neck.

The foregoing data appear to indicate that the load bearing effect contributed by the orifice varies inversely as some function of the orifice diameter. An explanation of why such plugging action is obtained with frusto-conical partitions having a short neck, whereas substantially no plugging occurs without the neck, appears to be that, as the mass of balls move upwardly within the frusto-conical partition they are caused to converge toward the outlet or orifice. As the balls reach the orifice a specific number of them seek to gain entrance into the orifice provided by the short neck. The resultant compacting action causes the balls to bridge. The bridging action apparently involves only several layers of balls, so that the entire resistance or plugging is effected within the few inches of neck length. That only one or two layers inside the neck do all the work is evident from the fact that, with 50 p.s.i. upward force against the cone, any balls above the plugging or locking interface can readily be moved about by hand without any effect on the load below the orifice.

The herein described apparatus for holding down the mass of catalyst and inert solids within the reactor makes possible the employment of relatively high flow rates for the fluid mixture passing upwardly through the solids mass. In operation, the alumina inerts are not as susceptible to crushing or attrition as the granular catalyst, so that shrinkage and settling is more likely to occur within the catalyst bed. As the mass settles, make-up alumina balls immediately flow from the fill tube through the orifice to add more large size alumina balls to the top portion of the covering layer of inerts. Any tendency for the large balls to be pushed back through the orifice is overcome by the described bridging or plugging action within the orifice neck.

In a typical hydrocarbon conversion operation utilizing the reactor of the invention, pyrolysis gasoline may be supplied as the hydrocarbon reactant through the upper distributor 22 at a temperature of about 80–250° F., hydrogen may be supplied as the gaseous reactant through the lower distributor 22' at a temperature of about 350–700° F., and recycle reactor effluent diluent may be supplied through bottom inlet 13 at a temperature slightly below the temperature of effluent leaving the reactor through outlet 43. Reactor bed temperature may be in the order of 560° F. The catalyst may be of known type and size suitable for the hydrogenation reaction.

Obviously, many modifications and variations of the invention as hereinbefore set forth may be made without departing from the spirit and scope thereof and therefore only such limitations shall be imposed as are indicated in the appended claims.

We claim:
1. A fixed-bed catalytic reactor for conversion of fluid hydrocarbons at least partly in liquid-phase, in which the reactants are caused to flow upwardly at relatively-high flow rate and in flooded operation through a supported, compact mass of solids, which mass includes a bed of granular catalyst and a covering layer of larger-size particles of inert material, said reactor comprising:
 (a) a generally cylindrical vertically-disposed closed catalytic reactor vessel, said vessel having upper and lower end walls;
 (a') hollow, frusto-conical means within the upper end of said reactor, arranged to contain the upper portion of said layer of inert material and to wholly define the surface contour thereof;
 (b) said frusto-conical means being spaced from the upper end wall of said reactor vessel to provide a plenum therebetween, and having multiple openings smaller than the particle-size of the contained inerts so as to permit passage of fluid reaction products from the solids mass into the plenum;
 (c) a reactor effluent outlet from said plenum;
 (d) means extending axially upward from the top of said vessel to provide a reservoir for replacement inerts;
 (e) said reservoir containing within its lower end the uppermost portion of said frusto-conical means;
 (f) a relatively-short, cylindrical neck secured to the uppermost perimeter of said hollow frusto-conical means to provide an orifice for intended compact flow of solids from said reservoir directly onto said covering layer of inerts;
 (g) said orifice having a length equivalent to at least several diameters of the inerts supplied from said reservoir, and a diameter substantially greater than the minimum length requirement;
 (h) and valve-controlled means for introducing into said reservoir replacement inerts for the top of said covering layer of inerts;
 (i) said orifice being such as to effect an immediate feed of reserve solids from the reservoir into the reactor whenever there is shrinkage of the mass of solids resulting from settling of the catalyst bed, and such as to maintain immobility of the solids mass as a whole by bridging of solids within the orifice to plug the same whenever there develops an adverse fluid pressure drop upwardly through the reactor tending to expand or lift the solids mass.

2. A reactor as in claim 1, in which said hollow frusto-conical means (a') comprises separate, frusto-conical sections forming a discontinuous frusto-conical envelope, the lower cone section being contained within the reactor vessel and having its lower perimeter attached to the vessel wall, and the upper cone section being contained within the reservoir extension (d) closely adjacent to the lower cone section.

3. A reactor as in claim 2, including
 (j) means at the gap between the adjacent perimeters of said separate sections of frusto-conical means (a') to prevent escape of solids from the covering layer of inerts into said plenum (b).

4. A reactor as in claim 3, in which said means (j) comprises a short cylindrical ring attached to the vessel wall and extending downwardly through said gap.

5. A reactor as in claim 2, in which said reservoir (d) is cylindrical, and said upper cone section of the frusto-conical means (a') has its lower end integral with
 (k) a removable cylindrical liner extending upwardly within the lower region of said reservoir.

6. A reactor as in claim 5, in which said extension means (d) forming the reservoir comprises separate disconnectable cylindrical sections, and said liner (k) is removably secured within the lower cylindrical section.

7. A reactor as in claim 1, in which said compact mass of solids is supported by
 (l) a horizontal grating in the lower region of said vessel, spaced from the bottom thereof to provide a mixing plenum for the introduced fluids, and which includes
 (m) means for introducing fresh, liquid-phase, hydrocarbon feed into said mixing plenum, in substantially uniform distribution, at a level closely adjacent the underside of said grating;
 (n) means for introducing said reactant gas into said mixing plenum, in substantially uniform distribution, at a level adjacent below said liquid hydrocarbon feed introducing means;
 (o) and inlet means for introducing liquid-phase hydrocarbons as heat-supplying diluent at the bottom of said mixing plenum.

8. A reactor as in claim 2, in which said multiple openings (b) in the frusto-conical means (a') are arranged in a broad circumferential band around said lower cone section, except for an imperforate area in line with and larger than the axially projected area of said reactor effluent outlet (c).

9. A reactor as in any one of claims 1, 2 and 8, in which the lower perimeter of the frusto-conical means attached to the vessel wall is provided with openings for drainage of liquid from the lowermost region of said plenum (b).

10. A reactor as in claim 1, in which the sides of said hollow, frusto-conical means are inclined to the horizontal at an angle greater than the angle of repose of the solids contained therein, whereby solids descending into the reactor from the reservoir area to fill the space within the frusto-conical means will freely spread radially outward to provide said surface contour wholly defined by said frusto-conical means.

References Cited

UNITED STATES PATENTS

| | | | |
|---|---|---|---|
| 877,243 | 1/1908 | Sperry | 23—283X |
| 903,122 | 11/1908 | Whiting | 261—96UX |
| 2,655,273 | 10/1953 | Snow | 23—288UX |
| 2,748,060 | 5/1956 | Hicks | 23—288X |
| 2,794,771 | 6/1957 | Evans | 23—288X |
| 2,846,368 | 8/1958 | Payne | 23—288X |
| 2,846,369 | 8/1958 | Halik | 23—288X |
| 2,893,945 | 7/1959 | Berg | 23—283X |
| 3,100,141 | 8/1963 | Donovan | 23—288 |
| 3,409,411 | 11/1968 | Mosley et al. | 23—288 |
| 3,479,146 | 11/1969 | Hochman et al. | 23—288 |

MORRIS O. WOLK, Primary Examiner

B. S. RICHMAN, Assistant Examiner

U.S. Cl. X.R.

23—283, 285; 208—146; 261—94